US007472658B2

(12) United States Patent
Ostlie

(10) Patent No.: US 7,472,658 B2
(45) Date of Patent: Jan. 6, 2009

(54) PLANTING DEVICES AND METHODS

(75) Inventor: L. David Ostlie, Corcoran, MN (US)

(73) Assignee: Energy Performance Systems, Inc., Rogers, MN (US)

( * ) Notice: Subject to any disclaimer, the term of this patent is extended or adjusted under 35 U.S.C. 154(b) by 154 days.

(21) Appl. No.: 11/489,897

(22) Filed: Jul. 20, 2006

(65) Prior Publication Data

US 2008/0017087 A1 Jan. 24, 2008

(51) Int. Cl.
A01C 11/00 (2006.01)
A01G 23/02 (2006.01)
(52) U.S. Cl. ........................................ 111/100; 111/900
(58) Field of Classification Search ......... 111/100–117, 111/200, 900
See application file for complete search history.

(56) References Cited

U.S. PATENT DOCUMENTS 6,167,819 B1  1/2001  Rail

2004/0050310 A1  3/2004  Culley

FOREIGN PATENT DOCUMENTS

DE   19845612   4/2000
EP   0067141    12/1982
EP   1649737    4/2006

Primary Examiner—Christopher J. Novosad
(74) Attorney, Agent, or Firm—Brooks, Cameron & Huebsch, PLLC

(57) ABSTRACT

The present disclosure includes various methods and devices for planting. One method embodiment includes providing a planting device having a frame, the planting device including a generally vertically oriented barrel and a ram slidable within the barrel for propelling a slip having a length placed therein. The method includes accelerating the ram, contacting the slip with the ram, and propelling the slip to a velocity such that the momentum of the slip is sufficient to fire the slip through an unprepared ground surface such that the slip penetrates the ground surface to a depth of at least 80% of the length of the slip.

28 Claims, 9 Drawing Sheets

PLANTING DEVICES AND METHODS

TECHNICAL FIELD

The present disclosure relates generally to planting associated with the fields of agriculture and forestry and, more particularly, to planting of tree slips and the like.

BACKGROUND

Trees can be harvested and used for building material and/or fuel, and can be processed for paper and/or cardboard among various other wood based products. It can be desirable or required to plant new trees to replace harvested trees to replenish and maintain forests.

Many hybrid trees can be reproduced from cuttings ("slips") taken from existing trees. These cuttings or slips are often available from nurseries in the form of sticks having a plurality of bud sites thereon. The sticks can come in various lengths and diameters depending upon the type of tree and cultural practices in the local area.

Manually planting the slips by spading or driving them into the ground by hand at desired locations can be slow, highly labor-intensive and generally costly. The slips can require careful planting placement at predetermined intervals and at a proper predetermined depth.

Mechanized planting has been attempted, but the early prototype tree planting machines had circular shaped stick drivers with a tangentially mounted hammer head that struck the slips in an essentially arcuate motion to drive them into the ground as the planter moved. This tended to damage the slips and often left the planted slip leaning at an undesirable angle with respect to vertical. Furthermore, the ground speed of such tree planting machines had to be matched closely to the rotational speed of the driver, thus limiting the speed of planting.

One mechanized planting device plants trees vertically by employing brakes and a pivoting mechanism to temporarily halt movement of a portion of the planter with respect to the frame to maintain a driving plunger horizontally stationary with respect to the ground while the frame is pulled across the ground. In such a planting device, the plunger arm of a hydraulic cylinder can be deployed downward to drivingly engage the tree slips into the ground. When using a hydraulic plunger arm to push the slips into the ground, the rate at which the slips are driven downward can be limited to the rate of the plunger arm itself. This can limit the slip planting rate (e.g., the number of slips planted per time), and can employ large amounts of hydraulic power in order to drive the plunger arm downward to a sufficient speed. The rate at which such devices drive the slips can often require preparing the ground soil prior to planting slips, e.g., by using a coulter or other planting preparation means, in order to plant the slips to an appropriate depth.

Such planting devices can also decrease the slip planting rate by limiting the speed at which the planting device frame and/or driving plunger can be moved across the ground in a planting direction, as the pivoting mechanism expands and retracts each time a slip is to be planted. Such planting devices can also be insufficient for planting slips in areas having terrain conditions that are hard, rocky, or dry, among other conditions.

BRIEF DESCRIPTION OF THE DRAWINGS

Features and advantages of the present disclosure will become more apparent from the following detailed description of the embodiments described below in detail with reference to the accompanying drawings where.

DETAILED DESCRIPTION

Figure 1:
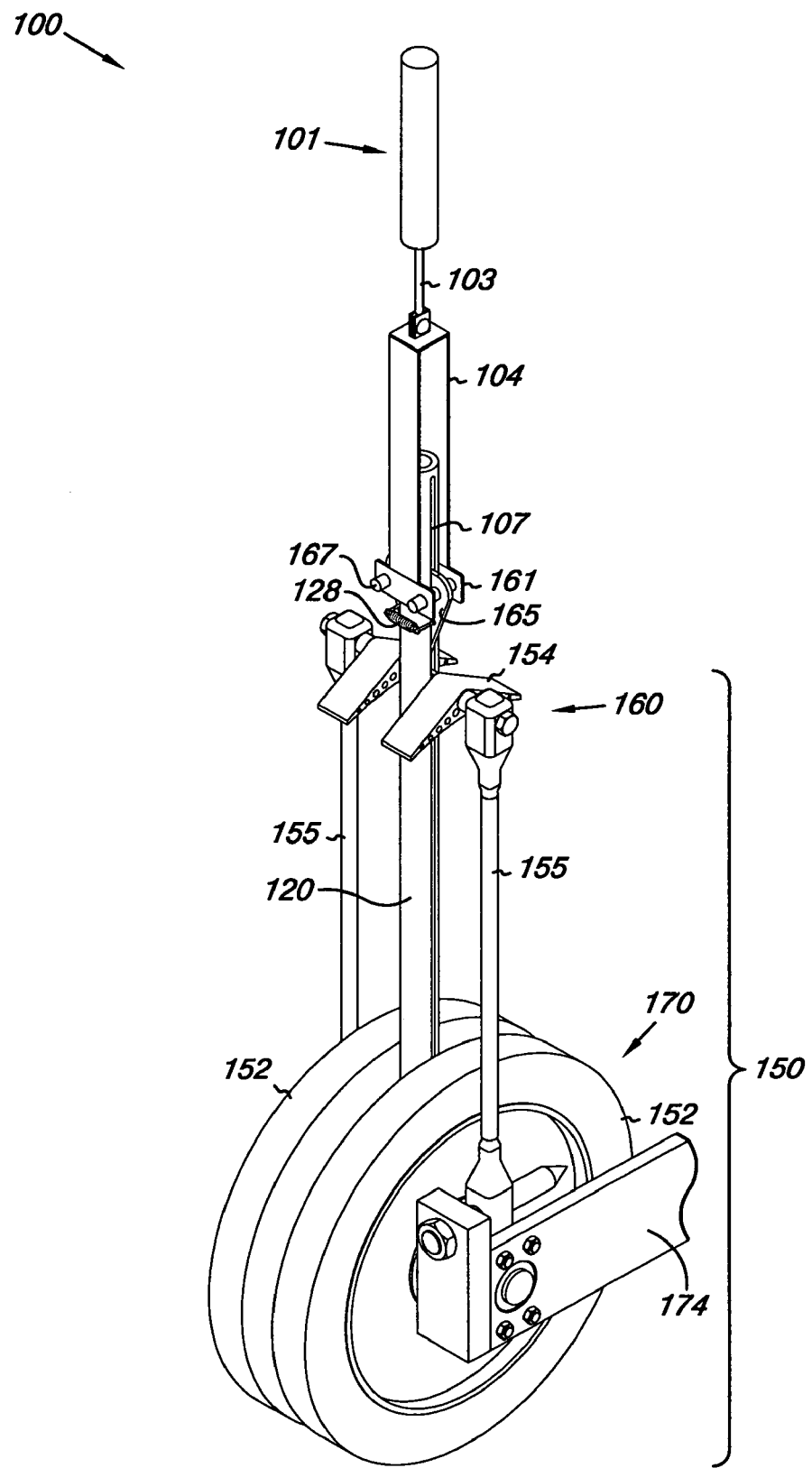
FIG. 1 illustrates a planting device according to an embodiment of the present disclosure.

The present disclosure includes various method and device embodiments for planting of tree slips, seedlings, and the like in the ground. One such method embodiment includes providing a planting device having a frame, the planting device including a generally vertically oriented barrel and a ram slidable within the barrel for propelling a slip having a length placed therein. The method includes accelerating the ram, contacting the slip with the ram, and propelling the slip to a velocity such that the momentum of the slip is sufficient to fire the slip through an unprepared ground surface such that the slip penetrates the ground surface to a depth of at least 80% of the length of the slip.

In various embodiments, the barrel is fixed with respect to the frame and is moving with respect to the ground surface during the firing of the slip through the ground surface. For example, in various embodiments, a vehicle, such as a tractor, can be attached to the planting device (e.g., with a three point hitch) to move the planter across the ground surface. Embodiments are not limited to a three point attachment. For instance, the planting device can be a floating type that can be raised and lowered with respect to the attached vehicle (e.g., by a hydraulic lift or other lifting mechanism), a semi-floating type that carries some of its own weight (e.g., on wheels or rails), or a trailer type that carries all or nearly all of its own weight.

In such embodiments, the barrel can be translating across the ground surface, e.g., at the speed of the vehicle, while the slip is fired through the ground surface, e.g., the barrel does not remain stationary in the direction of translation of the vehicle, with respect to the ground, when the ram contacts the slip. For example, in some embodiments a tractor can pull the planting device at about 8 feet per second. In such embodiments, various planting device embodiments of the present disclosure can inject tree slips into the ground in a substantially vertical direction while translating in the direction of travel at the speed of the tractor, e.g., 8 feet per second.

As use herein, substantially vertical includes angles of up to 20 degrees from vertical. However, various planting devices according to the present disclosure can plant tree slips at angles less than 20 degrees from vertical, e.g., 15 degrees, 10 degrees, or 5 degrees or less from vertical. Embodiments are not limited to these examples, e.g., some planting device embodiments of the present disclosure can plant slips at angles greater than 20 degrees from vertical.

In various embodiments, the ram can be in contact with the tree slip until the tree slip penetrates the ground surface to a particular depth, e.g., to a depth of 80% of the length of the slip. In such embodiments, the momentum of the tree slip can be defined as including the momentum of the ram in the calculation of the momentum of the tree slip. In some embodiments, the momentum of the tree slip is that of the slip itself.

In some embodiments, the ram is not in contact with the tree slip when the slip penetrates the ground surface. In such embodiments, the ram can contact the slip and accelerate the slip to a sufficient velocity such that the momentum of the slip is sufficient to penetrate the ground to an appropriate planting depth without further contact with the ram upon reaching the sufficient velocity. That is, in various embodiments, the ram may or may not be in contact with the tree slip when the tree slip penetrates the ground surface. In some embodiments, the slip is accelerated to a velocity of at least 100 feet per second, 200 feet per second, or 300 feet per second, but embodiments are not limited to a particular tree slip velocity since a sufficient velocity can depend on various factors including, soil conditions and/or type, tree slip dimensions, a suitable/desired planting depth, and/or a translational speed of the vehicle moving the planter, among other factors.

In various embodiments, the tree slips can be cooled slips. That is, in various embodiments, the tree slips can be cooled prior to penetrating the ground. Cooling of the slips can be achieved in a various manners, and the slips can be cooled to various temperatures. For example, in various embodiments, the slips can be cooled to temperatures at or near the freezing point of water. In other embodiments, the slips can be cooled to below or above the freezing point of water.

Cooling the slips can provide various benefits. For example, cooling the slips can increase the rigidity of the slip which may make it less susceptible to bending and/or breaking when being planted. Increasing the rigidity of the slip may allow the slip to be planted to a sufficient depth by accelerating it to a velocity below that used to plant an uncooled slip. The increased rigidity may also allow slips, which may be susceptible to bending/breaking when penetrating the ground surface at a given velocity, to be planted at that given velocity once the slip is cooled or frozen.

In various embodiments, cooling the tree slip can include freezing the tree slip such that at least a portion of the slip includes ice thereon when it is planted. In some embodiments, a portion of the slip or the entire slip can be encased in ice. The ice formed on and/or around the frozen slip can be of various thicknesses (e.g., 0.5 millimeters, 1 millimeter, or 2 millimeters, among other thicknesses).

Planting slips having ice thereon can provide various benefits. For example, as mentioned above, the rigidity of the slip can be increased, which can reduce or prevent bending and/or breaking of the slip during planting. Additionally, the ice formed on the slips can provide necessary hydration to the planted slip as the ice melts. In some embodiments, the ice can include various nutrients therein to provide nourishment to the slip as the ice melts.

Various embodiments of the present disclosure can be used to plant seedlings such as conifer seedlings, or other rooted stock. For example, a seedling to be planted can be frozen into a generally cylindrical ice structure such that the frozen structure resembles a tree slip. The generally cylindrical ice structure can have various diameters such as 0.5 inch, 1 inch, or 1.5 inches, among other diameters. In such embodiments, the cylindrically shaped frozen seedling is considered to be a "tree slip" as used herein.

In various embodiments the means for accelerating the ram is a recoil unit. For instance, in various embodiments, the planting device can include a tree slip accelerating unit fixedly attached to the frame in a vertical direction. In such embodiments, the accelerating unit can include a ram movable through a hollow vertical column, e.g., a barrel, and a recoil unit attached to a top end of the ram. In various method embodiments, the method can include firing the accelerating unit such that the recoil unit moves the ram downward against a tree slip to accelerate the tree slip downward such that the tree slip is planted substantially vertically into the ground while the accelerating unit is moving across the ground surface at a particular speed. In various embodiments, the accelerating unit is moved across the ground surface at a speed of at least eight feet per second while the accelerating unit is fired.

In various embodiments, a number of tree slips can be planted substantially vertically into the ground at a rate of at least one tree slip per second. In some embodiments, a frame may include more than one planting device, e.g., 2, 4, 6, or more devices, to facilitate planting of more than one row of slips at a time. In such embodiments, a number of tree slips can be planted substantially vertically into the ground at a rate of at least one tree slip per second per row, e.g., 2, 4, 6, or more rows can be planted each second.

In embodiments in which a recoil unit provides the ram/tree slip accelerating means, the recoil unit can have an upper portion and a lower portion connected by an elastic member, which can move from a stretched to unstretched position to accelerate the ram (and the tree slip after the ram contacts the slip). In various embodiments, the recoil unit can use one or more coil springs or leaf springs (e.g., carbon resin bent leaf springs), among other means to provide the downward acceleration of the ram.

In various embodiments, the planting device can include a lifting mechanism that can have a trigger mechanism attached thereto. In such embodiments, the trigger mechanism can engage a top end of the ram and the upper portion of the recoil unit can be moved upward to a first position, e.g., to a position in which the elastic member is stretched. In some such embodiments, the accelerating unit can then be fired, e.g., by disengaging the trigger mechanism from the ram such that the ram is propelled downward to a second position, e.g., to a position in which the elastic member is unstretched, by a recoil force of the recoil unit. In some embodiments, the accelerating unit can be fired by moving the trigger mechanism against a disengagement member as described further below.

In various embodiments, the downward recoil force can move the upper portion of the recoil unit and/or the ram at various rates depending on factors such as the composition of the elastic member and/or the distance that the elastic member is stretched, among various other factors. As an example, the composition of the elastic member can be natural rubber or an elastomeric polymer, among other compositions, and the elastic member can be stretched various distances such as 6 inches 9 inches, or 12 inches, among other distances. In some embodiments, the downward force can accelerate the ram to a rate of 230 feet per second. However, embodiments are not limited to these exemplary compositions, distances, or rates. For instance, in various high speed planting device embodiments, the ram can be accelerated to various speeds above and/or below 230 feet per second in order to plant tree slips.

In various embodiments, a tree slip is delivered, in a vertical position, to a slot in the bottom end of the barrel prior to the accelerating unit being fired. Also, in some embodiments, the accelerating unit is fired such that a bottom end of the ram is not more than 2 inches from an upper end of the tree slip when the accelerating unit is fired, (e.g., the separation distance between the slip and ram at the time of firing is less than two inches). Embodiments are not limited to a particular separation distance, as the appropriate distance can vary depending on various factors including the acceleration of the ram, the size of the slip, etc.

Embodiments of the present disclosure are not limited to planting methods and/or devices in which the means for accelerating the ram is a recoil unit. For instance, the means for accelerating the ram, e.g., firing an accelerating unit, can be compression of a gas such as air or combustion of a gas, such as propane or diesel fuel, or a combustible gas mixture.

FIG. 1 illustrates a planting device according to an embodiment of the present disclosure. In this embodiment, the planting device 100 includes a lifting unit 101, a hollow vertical column, e.g., a barrel 120, and a recoil unit 150.

In the embodiment illustrated in FIG. 1, the lifting unit 101 includes a hydraulic cylinder which can be mounted to the frame of the planting device in a vertical direction. In this embodiment, the plunger arm 103 (piston) of the hydraulic cylinder is attached to a pair of elongate parallel plates 104. Each of the pair of elongate parallel plates is attached to a face plate 161, between which a trigger mechanism 165 is pivotally mounted for pivoting about pins 167. As used herein, a recoil unit, e.g., recoil unit 150, and a trigger mechanism, e.g., trigger mechanism 165 may be referred to collectively as a "tree slip accelerating unit," or simply as an "accelerating unit."

Embodiments of the present disclosure are not limited to a lifting unit that includes a hydraulic cylinder. For example, the lifting unit can include a pneumatic lifting mechanism or other lifting mechanism.

In various embodiments, the trigger mechanism 165 can be slidably attached to the hollow vertical barrel 120 for vertical movement thereon. In the embodiment illustrated in FIG. 1, barrel 120 includes vertical side slits 107 in which the trigger mechanism 165 can move. The trigger mechanism can be force biased to a closed position with a spring 128 or other tension providing member and can pivot between an open and closed position. A trigger mechanism embodiment is described in greater detail below in connection with FIG. 5A-5B.

In the embodiment illustrated in FIG. 1, the recoil unit 150 is positioned near a lower end of the barrel 120. In this embodiment, the barrel includes a tree slip receiving slot (shown in FIGS. 2A-2B) to receive tree slips. In various embodiments, a ram (shown in FIGS. 4 and 5A-5B) passes vertically through the barrel to contact tree slips and accelerate them to a velocity such that the momentum of the slips is sufficient to fire the slips through the ground surface to an appropriate depth, e.g., to a depth below the surface of about 80% or 90% of the length of the slips. In various embodiments, the ram remains in contact with the slip such that the momentum of the ram can be used to push the slip into the ground to the proper depth.

Figure 4:
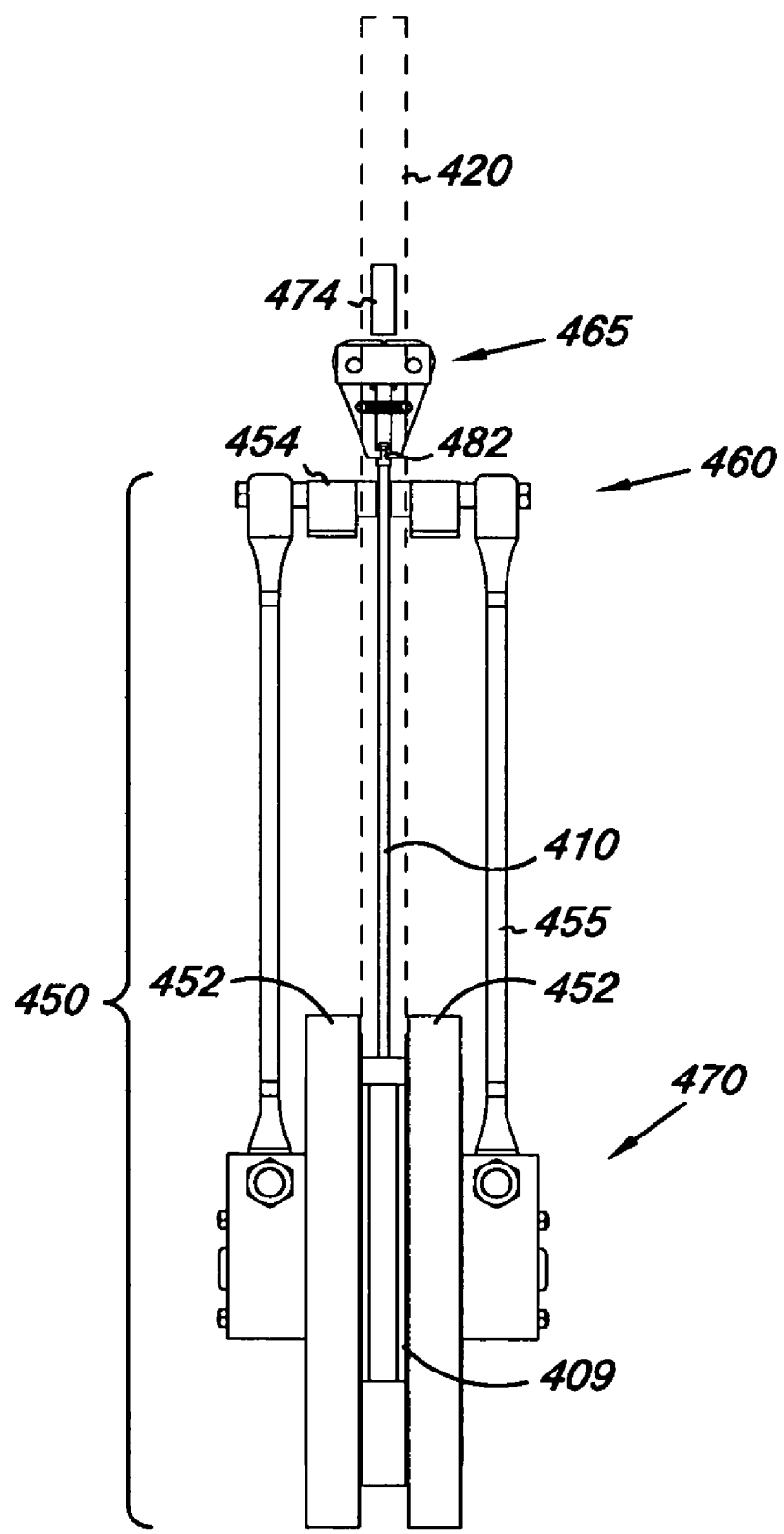
FIG. 4 is a cross-sectional view of a planting device according to an embodiment of the present disclosure.
Figure 5A:
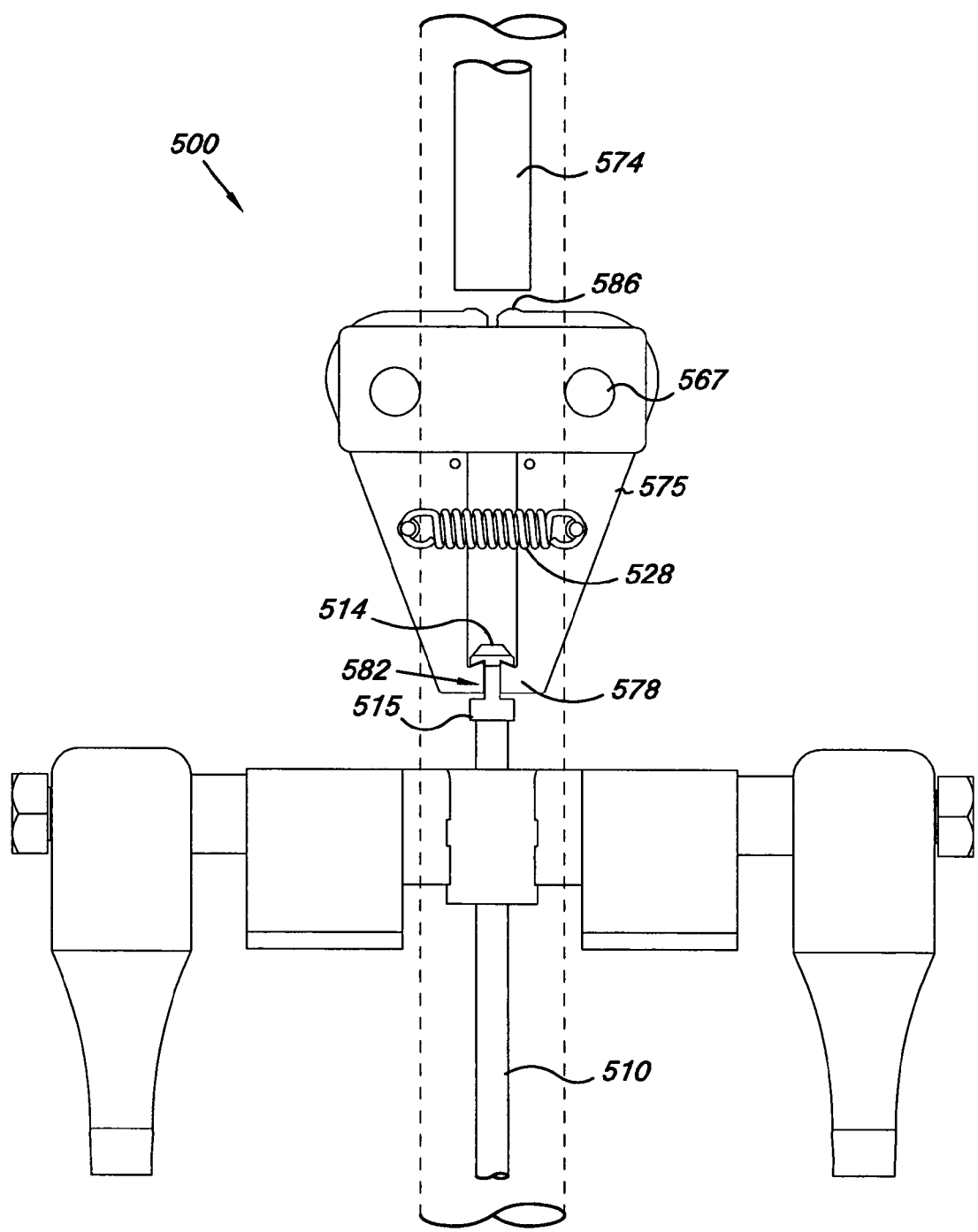
FIG. 5A is a schematic of a trigger mechanism in a closed position according to an embodiment of the present disclosure.
Figure 5B:
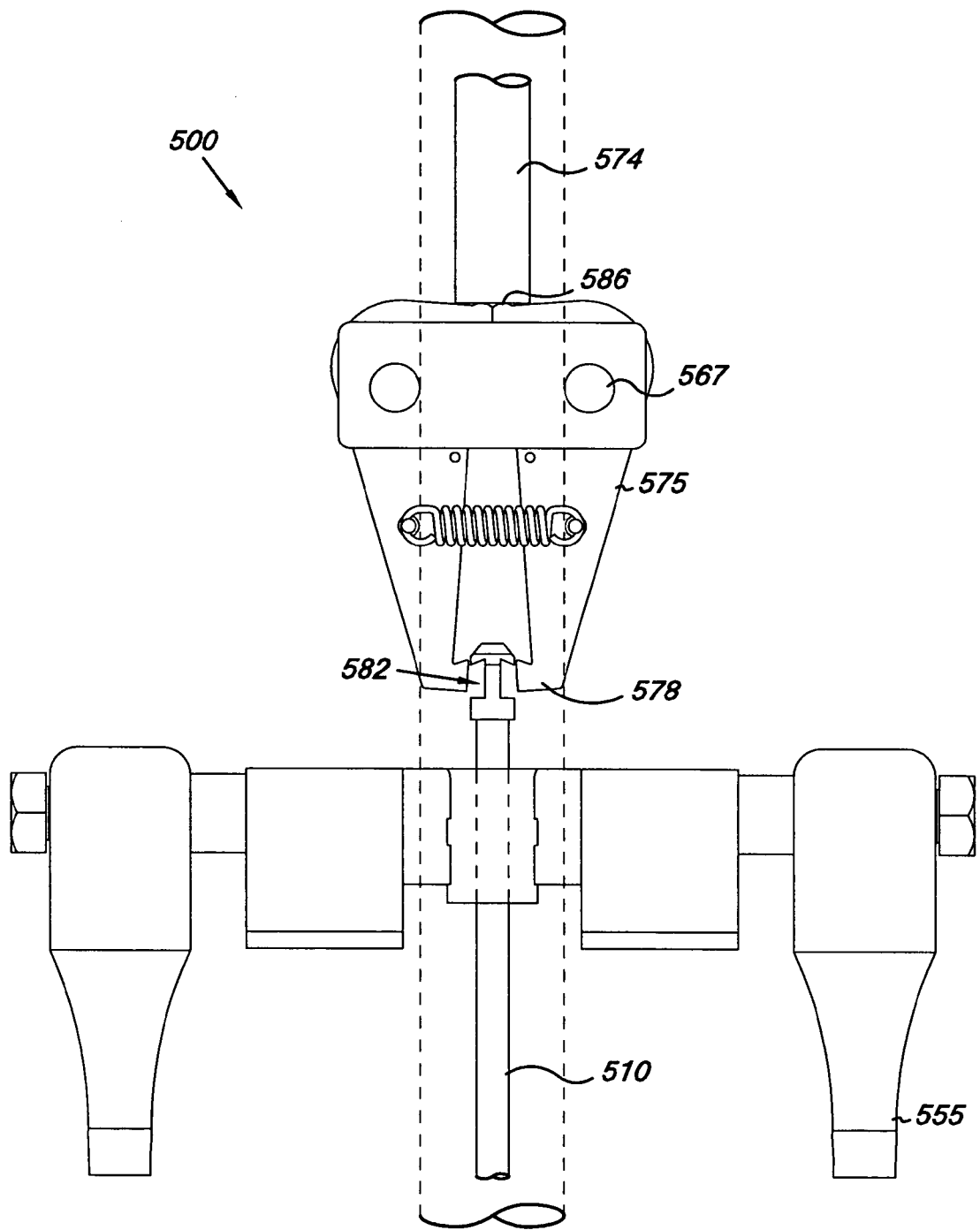
FIG. 5B is a schematic of the trigger mechanism of FIG. 5A in an open position according to an embodiment of the present disclosure.

As described in FIGS. 4 and 5A-5B, the ram can have various lengths (e.g., 8 inches, 12 inches, 20 inches), diameters (e.g., 1 inch, 1.25 inches, 1.5 inches), compositions (e.g., various metals or plastics), and shapes (e.g., an elongate cylinder), which can depend on various factors including the size of the tree slips or downward acceleration of the ram, among other factors.

The planter embodiments of the present disclosure can be used to plant tree slips of varying sizes substantially vertically into the ground. For instance, the tree slips can have diameters of about 0.25-1.0 inches and lengths of about 8-20 inches; however, embodiments are not limited to tree slips having these dimensions.

In various embodiments, and as shown in the embodiment of FIG. 1, the recoil unit 150 includes an upper portion 160 slidably attached to the barrel 120 for vertically moving thereon between a first position and a second position. In various embodiments, and as more clearly shown in FIGS. 4 and 5A-5B, the upper portion 160 of the recoil unit 150 can be attached to the ram near a top end of the ram.

As illustrated in the embodiment of FIG. 1, the recoil unit 150 can include an elastic member 155 attached from the upper portion 160 to a lower portion 170 of the recoil unit for providing a downward recoil force to move the upper portion from the first to the second position, as discussed further below in connection with FIGS. 2A-2B. As mentioned above, the elastic member can be made of a dense rubber or various other elastic materials having high spring constants.

In various embodiments, the lower portion of the recoil unit can be mounted to the frame of the planting device such that the lower portion is fixed in the vertical direction and can include a stop to prevent the upper portion from moving past the second position in a downward vertical direction. In the embodiment illustrated in FIG. 1, the lower portion of the recoil unit is mounted to a portion of the frame 174. Although only a portion of the frame is shown, the reader will appreciate, that the frame of planting device 100 can be attached to the device at various other locations on the device to provide stability during planting. Furthermore, the frame can be attached to a number of planting devices 100, e.g., 2 or more, and the frame may not be connected to a lower portion of the recoil unit as shown in the embodiment of FIG. 1.

In the embodiment illustrated in FIG. 1, the lower portion stop is a pair of shock absorbing rubber wheels 152. In such embodiments, the lower portion stop can receive the upper portion of the recoil unit when the accelerating unit is fired, e.g., when the ram is released by the trigger mechanism, to prevent the upper portion from moving past the second position. In various embodiments, the shock absorbing wheel can be made of highly dampened rubber or other suitable shock absorbing materials.

In various embodiments, the shock absorbing wheel or wheels can be rotatably mounted to the frame. In such embodiments, the wheel can be positioned such that rotation is provided by the ground as the planting device moves across the ground surface, or the wheel can be positioned off the ground with rotation being provided by a motor or other suitable means. The wheel or wheels can have an axis of rotation that is horizontal or slightly tilted from horizontal and may act to pack the soil around the tree slip in embodiments in which the wheel is moved across the ground surface.

In various embodiments, the upper portion of the recoil unit can also include a stop. In such embodiments, the stop of the upper portion can engage the stop of the lower portion to prevent the upper portion from moving past the second position. Preventing the upper portion from moving past the second position can facilitate a suitable planting depth of the tree slip by limiting the distance that the ram moves.

As an example, the lower stop can be positioned such that the bottom of the ram is a particular distance above the ground when the upper portion of the recoil unit is in the second position (e.g., when the recoil unit is unstretched and the downward motion of the ram is stopped). For instance, in some embodiments, the lower stop is positioned such that the ram is about one inch above the ground surface when the upper portion of the recoil unit is in the second position. In some such embodiments, tree slips can be planted to a depth of one inch above the surface. That is, the ram can remain in contact with the slip until the slip is planted to a depth such that one inch of the slip remains above the ground surface.

In this embodiment, the upper portion stop of the recoil unit 150 is a pair of metal shock shoes 154 having a concave lower surface. The curvature of the shock shoes can facilitate suitable heat transfer as the shoes engage the shock absorbing wheels each time the upper portion is moved from the first to the second position by the elastic member. Embodiments are not limited to the number of, composition of, or type of stops.

Figure 2A:
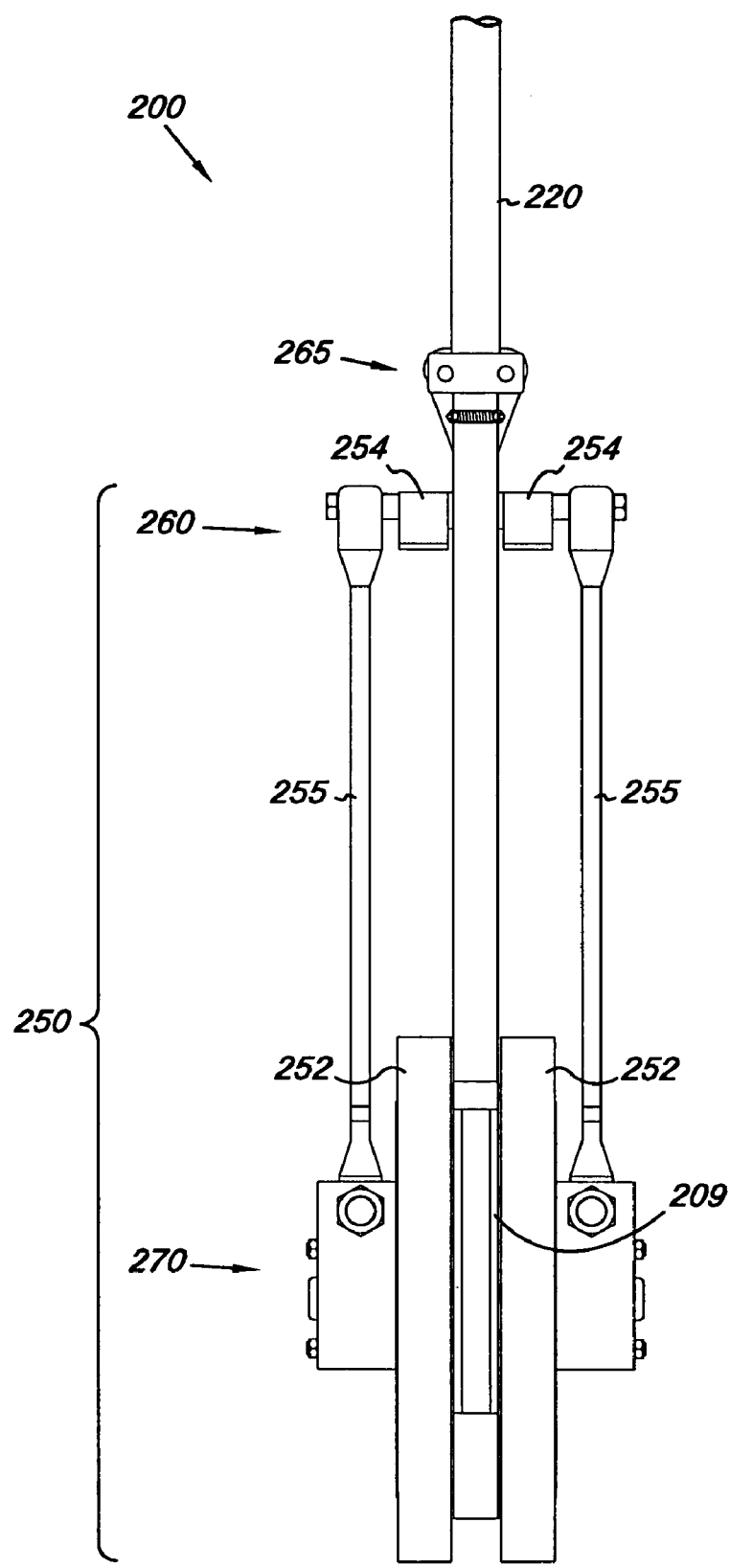
FIG. 2A illustrates a planting device having a recoil unit in a first position according to an embodiment of the present disclosure.

In various embodiments, the lifting device 101 can be used to lower the trigger mechanism 165 for engaging the top end of the ram as shown in FIGS. 4 and 5A-5B and can be used to raise the upper portion 160 of the recoil unit 150 to the first position (e.g., to a position in which the elastic member 155 is stretched as shown in FIG. 2A).

Figure 2B:
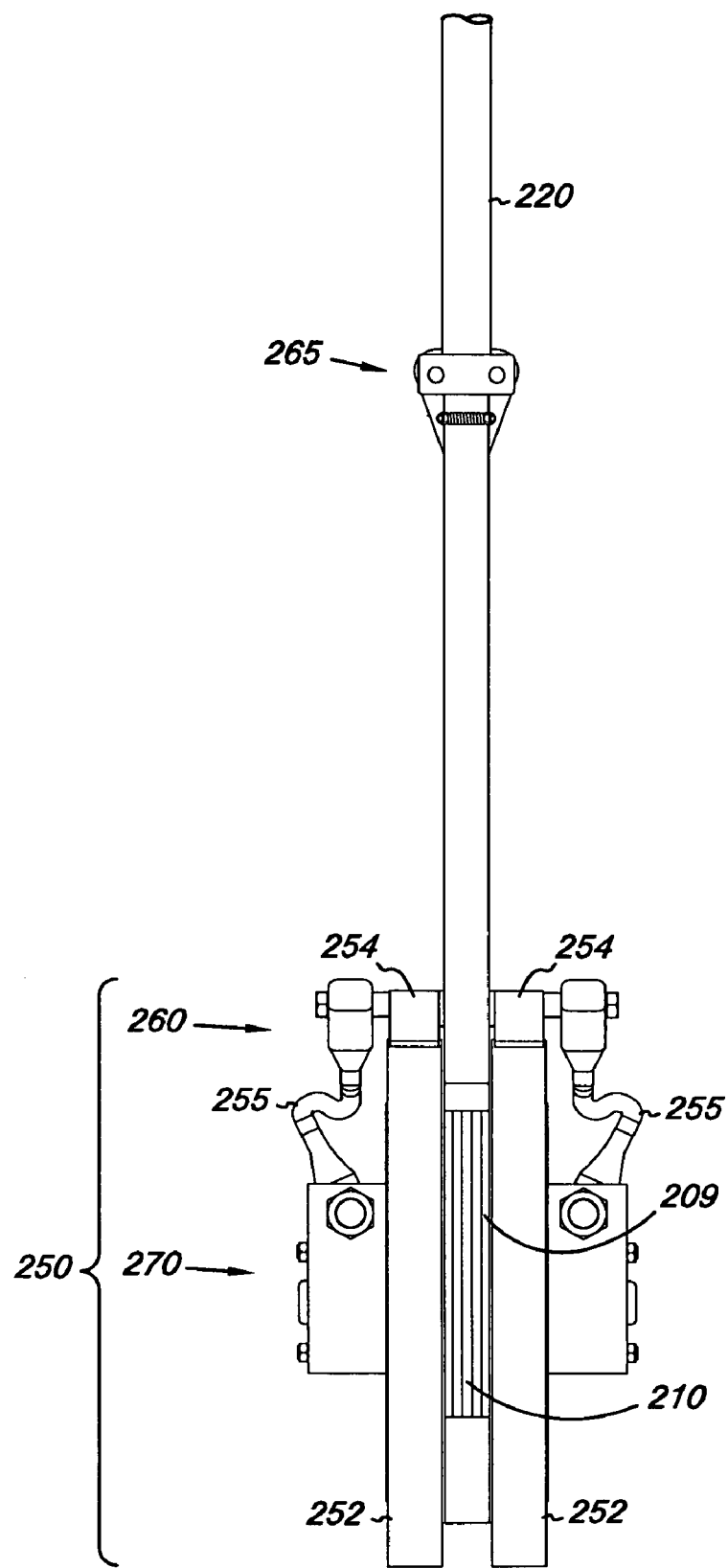
FIG. 2B illustrates the planting device of FIG. 2A having the recoil unit in a second position according to an embodiment of the present disclosure.

In various embodiments, the accelerating unit is fired, e.g., the trigger mechanism disengages the ram, when the upper portion of the recoil unit reaches the first position allowing the downward recoil force to propel the upper portion downward to the second position (e.g., a position in which the elastic member 155 is unstretched as shown in FIG. 2B) such that the ram contacts the tree slip and accelerates the slip downward such that the tree slip is planted substantially vertically into the ground.

In various embodiments, the accelerating unit is fired while the accelerating unit (e.g., barrel 120, recoil unit 150, and trigger 165) is moving across the ground surface. That is, in various embodiments, the accelerating unit does not stop translating with respect to the ground surface. In various embodiments, the accelerating unit remains stationary in the horizontal plane with respect to the frame as the planting device translates across the ground surface. In is noted that portions of the accelerating unit such as the ram and recoil unit may move with respect to the frame and ground in the vertical plane despite remaining stationary with respect to the frame in the horizontal plane.

In various embodiments, firing the accelerating unit causes the ram to accelerate tree slips downward to a rate, e.g., a velocity, of at least 200 feet per second. Embodiments are not so limited. That is, in various embodiments, firing the accelerating unit can cause the ram to accelerate tree slips downward to rates less than 200 feet per second.

In various embodiments, and as described below in connection with FIG. 6, the operation of the planting device can be controlled with one or more programmable logic controllers (PLCs). The PLCs can receive electrical inputs from various sensors (e.g., proximity sensors, motion sensors, and/or temperature sensors, among other sensors) and other electrical components (e.g., switches) that can be located at various locations on or around the planting device. The various sensors can provide information to the PLC as to the physical position and or speed of the ram and/or the trigger mechanism (e.g., trigger 165), the presence of a tree slip in a receiving slot, and/or the position/orientation of the tree slip upon being fired into the ground, among various other information. The PLCs can also use various received input signals to control various output components, such as electromechanical valves to operate the hydraulics associated with the lifting unit, recoil unit, and/or slip feeder, among other hydraulic components. For example, the PLC can control the hydraulic cylinder 101 to lower the trigger mechanism 165 to engage the ram and to raise the trigger mechanism 165.

As illustrated in FIG. 1, in various embodiments, the plunger 103 of the hydraulic cylinder 101 of planting device 100 is not used as the ram to inject the tree slips into the ground. Using a hydraulic plunger to accelerate the ram into contact with the slip may prevent the slip from reaching a sufficient velocity as the downward acceleration of the ram may be limited, which can result in slip bending and/or breakage. In various embodiments, and as discussed herein, the hydraulic cylinder plunger 103 can be used to lower the trigger mechanism 165 in order to engage the ram. The plunger 103 can also be used to raise the ram 110 (i.e., the ram engaged to the trigger mechanism) to a position at which the accelerating unit is fired, e.g., the ram is disengaged from the trigger mechanism, in order to accelerate a tree slip to a velocity such that the momentum of the slip is sufficient to fire the slip thorough the ground surface to a sufficient planting depth. In such embodiments, hydraulic power can be saved and/or conserved since hydraulic power is not used to rapidly accelerate the hydraulic plunger downward.

As mentioned above, in various embodiments, the planting device 100 can plant tree slips vertically into the ground while the vertical barrel 120 is fixed with respect to the frame and is moving with respect to the ground surface as the planting device translate across the ground. For example, in one embodiment, the planting device 100 can be pulled behind a tractor (not shown) at a rate of about 8 feet per second. In such an embodiment, the planting device 100 can propel the tree slips substantially vertically into the ground as the frame, vertical barrel, and ram maintain the translational speed of the tractor (e.g., 8 feet per second). In such embodiments, accelerating means, e.g., an elastic member or gas combustion, can accelerate the ram to a speed of about 230 feet per second when the trigger mechanism 165 is disengaged from the ram at the first position, e.g., when the accelerating unit is fired.

In some embodiments, it may be beneficial to change the downward speed the ram and/or slip reaches by changing the accelerating means. One such benefit of embodiments of the present disclosure includes the ability to reduce and or prevent the bending or breaking of slips, which may occur if the slips are not accelerated to a sufficient speed, e.g., a speed above 200 feet per second, depending on various factors. As one example, changing the accelerating means includes changing the size and/or composition of the elastic member and/or the distance between the first and second position (e.g., how much the elastic member is stretched prior to recoiling upon disengagement of the trigger mechanism). A suitable downward ram speed can depend on various factors including the translational speed of the planter (or tractor) across the ground, the diameter of the tree slips, or the type of soil among other factors.

As an example of determining a suitable downward ram speed, or downward slip speed, consider a planting device that is to plant a 12 inch slip per second while the device is translating at 8 feet (e.g., 96 inches) per second. Assume that the slip will be damaged (e.g., break or kink) if the device translates more than 0.5 inch from the time the slip penetrates the ground surface until the slip is planted to the appropriate depth (e.g., 10 inches) in the ground. In this example, in order to prevent the slip from being damaged, the slip must be planted to the 10 inch depth in about 5 milliseconds. Therefore, a suitable downward speed of the slip into the ground would be at least 2,000 inches (e.g., 170 feet) per second in order to plant the slip to a 10 inch depth without damaging the slip. It is noted that this example suitable downward ram speed can depend on various factors such as the soil type, slip dimensions, desired slip planting rate, and/or the translational speed of the device, among other factors.

In embodiments in which a combustible gas or gas mixture is used to accelerate the ram, the downward speed of the ram can depend on various factors that can be adjusted such as the type/composition or pressure of the gas, among other factors.

As mentioned above, the speed to which planting various planting device embodiments of the present disclosure, e.g., planting device 100, can accelerate tree slips in order to sufficiently plant them vertically in the ground can reduce or eliminate the need to prepare the ground surface. For instance, in various embodiments, the recoil unit 150 of the planting device can propel tree slips downward to speeds, e.g. over 100 feet per second, sufficient to plant slips without using a trench forming device such as a coulter wheel, for example.

In various embodiments, a planting system can include more than one planting device. For example, in one embodiment, a frame of the planting system includes six planting devices laterally spaced apart such that six rows of tree slips can be planted. In such embodiments, the planting devices can be configured to plant a tree slip at a rate of about 1 tree slip per second per row, such that the system can plant about six slips per second. The planting devices may be operated in concert with each other or individually (e.g., some or all of the planting devices may accelerate tree slips downward at the same time). In some system embodiments, the multiple planting devices can be positioned on a planting system frame having a "V" design as is understood by those of ordinary skill in the art.

In various embodiments of the present disclosure, the planter can include a hopper to store several tree slips to be planted. The slips can be received to a receiving slot (e.g., slot 209 as shown in FIGS. 2A-2B) of the barrel 120 from a tree slip feeder. In one embodiment, the tree slip feeder can include a pair of parallel plates spaced apart a suitable distance (e.g., 0.75 inches, 1 inch, 1.5 inches) so as to fit between the shock absorbing stops of the recoil mechanism to deliver the slips in a vertical orientation to a slot (e.g., slot 209 as shown in FIGS. 2A-2B) in the barrel. In various embodiments, the tree slip feeder can be hydraulically operated and controlled by a PLC of the planting device.

In various embodiments, the slips received to the barrel can be accelerated downward without being vertically supported. That is, in various embodiments, the planter is configured such that the trigger mechanism is fired (e.g., opened or disengaged) nearly simultaneously with the slip being delivered to the barrel (e.g., after a short delay of 0.15 seconds, 0.2 seconds, 0.25 seconds, or 0.30 seconds, among other time delays). In such embodiments, this short time delay coupled with the fact that the ram can be accelerated downward by the recoil force of an elastic member to speeds of about 200-250 feet per second, can cause the ram to contact the top end of the slip prior to the slip falling a substantial distance due to gravity.

As previously mentioned, the frame can be attached to, and/or pulled behind, a vehicle, e.g., a tractor. In such embodiments, the vehicle may include various components such as hydraulic pumps and/or motors to operate various components of high speed planting devices 100 (e.g., lifting unit 101, recoil unit 150, and/or a tree slip feeder, among other components).

Also, in some embodiments, the planter and/or a vehicle to which it is attached, can include a global positioning system (GPS) to accurately determine the real-time position and/or velocity of the vehicle and/or planter. In such embodiments, signals can be generated by the GPS and sent to a PLC of the planting device to cause the device to plant tree slips at predetermined locations or coordinates. In various embodiments, the GPS velocity can be input to the PLC circuitry and used in timing when the planting device(s), or accelerating unit thereof, is to be fired, i.e., when the trigger is to be opened, or disengaged from the ram.

FIGS. 2A and 2B illustrate a planting device having a recoil unit in a first position and a second position, respectively, according to an embodiment of the present disclosure. In the embodiment illustrated in FIG. 2A-2B, the recoil unit 250 includes an upper portion 260 slidably attached to a hollow vertical column, e.g., barrel 220, and a lower portion 270 rotatably mounted to the frame of the planting device 200 in a fixed vertical position. In this embodiment, the recoil unit 250 includes an elastic member 255 attached from the upper portion 260 to the lower portion 270 for providing a downward recoil force to accelerate the upper portion from the first position (FIG. 2A) to the second position (FIG. 2B).

As discussed below in connection with FIGS. 4 and 5A-5B, the upper portion 260 can be attached to a ram which can be engaged with a trigger mechanism 265 at the ram's top end (e.g., a trigger catch 682 as shown in FIGS. 5A-5B) and raised to the first position as shown in FIG. 2A. The trigger mechanism can then be fired, e.g., disengaged from the ram, allowing the elastic member 255 to recoil, rapidly pulling the upper portion 260 (and ram) downward until a stop 254 of the upper portion engages a stop 252 of the lower portion at the second position as shown in FIG. 2B.

Embodiments of the present disclosure are not limited to the recoil unit shown in FIGS. 2A and 2B. For example, the ram 210 (e.g., the upper portion 260) can be accelerated downward by a means other than the elastic member 255 shown. In various embodiments, the elastic member can be one or more coil springs and/or leaf springs having high enough spring constants to provide a downward acceleration of the ram sufficient to plant tree slips.

In the embodiment illustrated in FIG. 2B, a portion of the ram 210 is shown as extending vertically through slot 209. The ram is shown in detail in connection with FIGS. 4 and 5A-5B.

Figure 3:
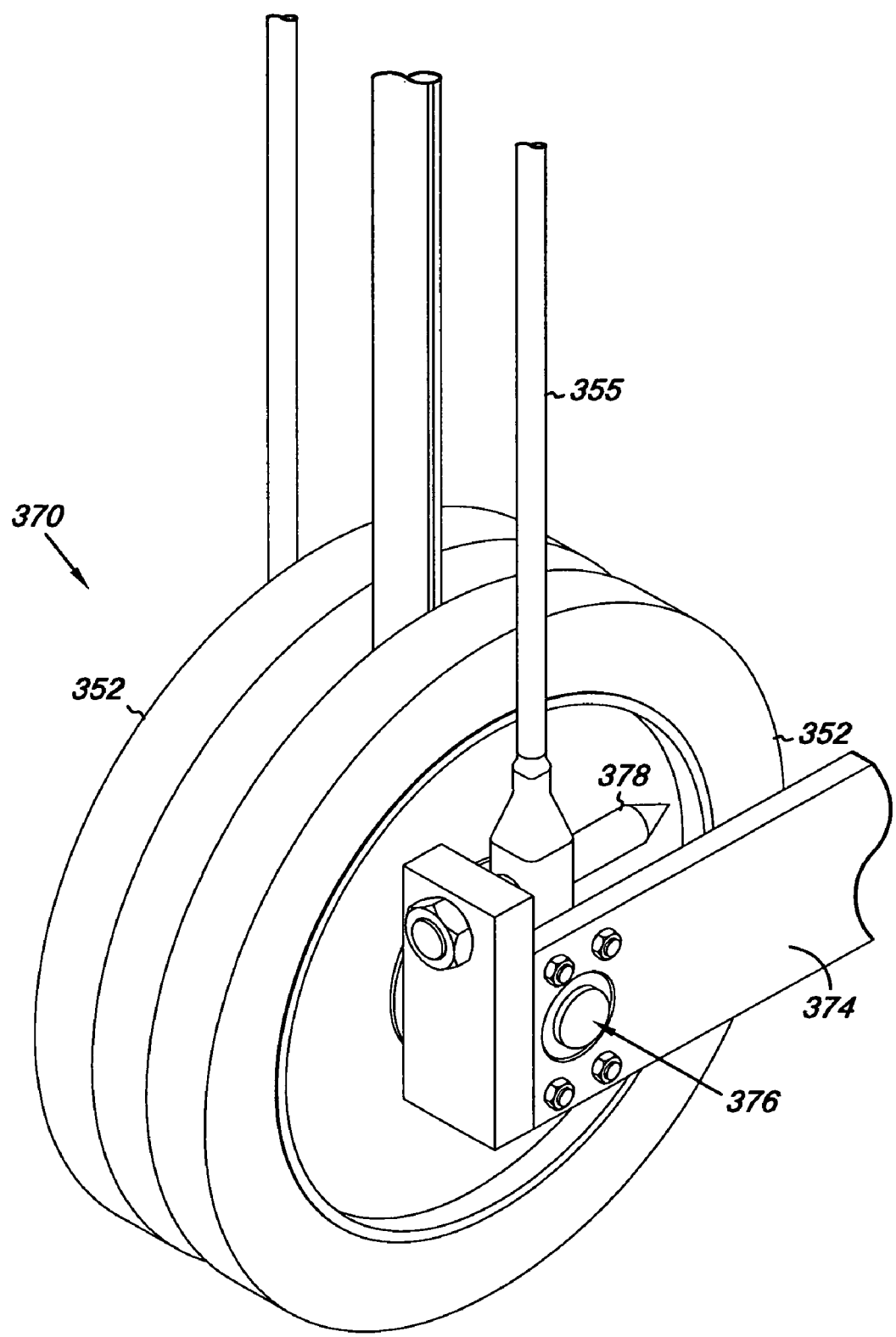
FIG. 3 is a side view of the lower portion of a recoil unit according to an embodiment of the present disclosure.

FIG. 3 is a side view of the lower portion of a recoil unit according to an embodiment of the present disclosure. In the embodiment shown in FIG. 3, the lower portion 370 of the recoil unit includes a pair of shock absorbing wheels 352. In this embodiment, each wheel is rotatably mounted to a bracket 374 that can be attached to the frame such that each wheel can rotate about an axle 376. In this embodiment, the wheels are positioned so as to rotate along the ground during operation of the high speed planting device. In some embodiments, the shock absorbing wheels may not be rotatably mounted and/or may be positioned off of the ground surface during planting operations.

In the embodiment illustrated in FIG. 3, the bracket 374 includes a pin 378 to which an elastic member 355 is attached. The elastic member can be attached to the lower portion 370 in various manners and at various other locations.

FIG. 4 is a cross-sectional view of a planting device according to an embodiment of the present disclosure. In the embodiment of FIG. 4, the planting device includes a barrel 420 through which the ram 410 moves. The embodiment of FIG. 4 also includes a recoil unit 450 as described above.

As shown in the embodiment of FIG. 4 and as described below in connection with FIGS. 5A-5B the upper portion 460 of the recoil unit can be attached to a top end of the ram 410. In various embodiments, and as illustrated in FIG. 4, the upper portion 460 of the recoil unit is attached below a trigger catch 482 at a top end of the ram 410. The trigger catch 482 can be engaged/disengaged to/from a trigger mechanism 465. The interaction of the trigger catch and trigger mechanism is discussed further in connection with FIGS. 5A-5B below.

In the embodiment shown in FIG. 4, the vertical barrel 420 includes a tree slip receiving slot 409 at a lower end of the barrel. During operation of various planter embodiments, tree slips are received in a vertical orientation to the slot 409 from a tree slip feeder (not shown) and are propelled to a velocity such that the momentum of the slip is sufficient to fire the slip through an unprepared ground surface such that the slip penetrates the ground surface to a suitable/desired depth.

For example, the upper portion 460 can be moved vertically upward to a first position (e.g. the position shown in FIG. 2A), creating a tension in the stretched elastic member 455. The trigger mechanism can then be disengaged from the trigger catch 482 of the ram 410 such that the upper portion 460 (and ram 410) is rapidly pulled downward to a second position (e.g., the position shown in FIG. 2B) at which the shock shoes 454 engage the shock absorber 452 of the lower portion 470 of the recoil mechanism. Disengagement, or firing, of the trigger mechanism can occur as the top end of the trigger mechanism is moved upward against a disengagement member 474. The disengagement member 474 can be a cylindrical member mounted inside the vertical barrel 420, as shown in FIGS. 4 and 5A-5B. Alternatively, the PLC could be used to control the opening/closing (i.e., the engaging/disengaging, or firing) of the trigger mechanism.

FIGS. 5A and 5B illustrate an embodiment of a trigger mechanism in a closed and open position, respectively. In the embodiment illustrated in FIGS. 5A and 5B, the trigger mechanism 500 includes a pair of trigger plates 575 which can engage the top end of an elongate ram 510.

Each trigger plate 575 has an opening that receives a pin 567 therethrough about which the plates can pivot to engage and disengage the ram 510. As illustrated in this embodiment, each plate 575 includes a tooth 578 which can engage a trigger catch 582, or notch of the ram 510.

In this embodiment, the trigger catch 582 is formed between the rounded top end 584 of the ram and an enlarged diameter portion 515 of the ram 510. The trigger plates 575 can be force biased in a closed position with a spring, e.g., a coil spring 528 as shown in FIG. 1, or another suitable spring. As the closed plates 575 are moved downward against the rounded end 584 of the ram, the plates open slightly as the spring force is overcome enough that the plates pivot about pins 567 such that the teeth 578 engage the trigger catch 582 as the plates are forced downward.

As illustrated in the embodiment of FIG. 5A, each trigger plate 575 can include a protrusion 586 that can engage a release member 574 as the trigger mechanism 500 is moved upward in order to disengage (open) the trigger plates 575 as shown in FIG. 5B. That is, from the closed (engaged) position shown in FIG. 5A, the ram 510 can be moved upward to a suitable distance from which it can be released to accelerate downward and contact a tree slip to accelerate the tree slip to a velocity such that the momentum of the slip is sufficient to propel the slip through a ground surface such that the slip penetrates the ground to a suitable planting depth.

FIG. 5B is a schematic of the trigger mechanism of FIG. 5A in an open (disengaged) position. In the embodiment of FIG. 5B, the trigger mechanism 500 has been moved upward such that the protrusions 586 of the trigger plates 575 have engaged the release member 574. The interaction of the protrusions 586 with the release member 574 causes the trigger plates 575 to pivot outward about pins 567 thereby disengaging teeth 578 from the trigger catch 582. As discussed herein, disengaging the trigger mechanism 500 at a raised position causes the ram 510 to be accelerated downward by the force of the elastic member 555, as discussed in connection with FIG. 1, for example. Embodiments of the present disclosure are not limited to the trigger mechanism described in FIGS. 5A-5B.

Figure 6:
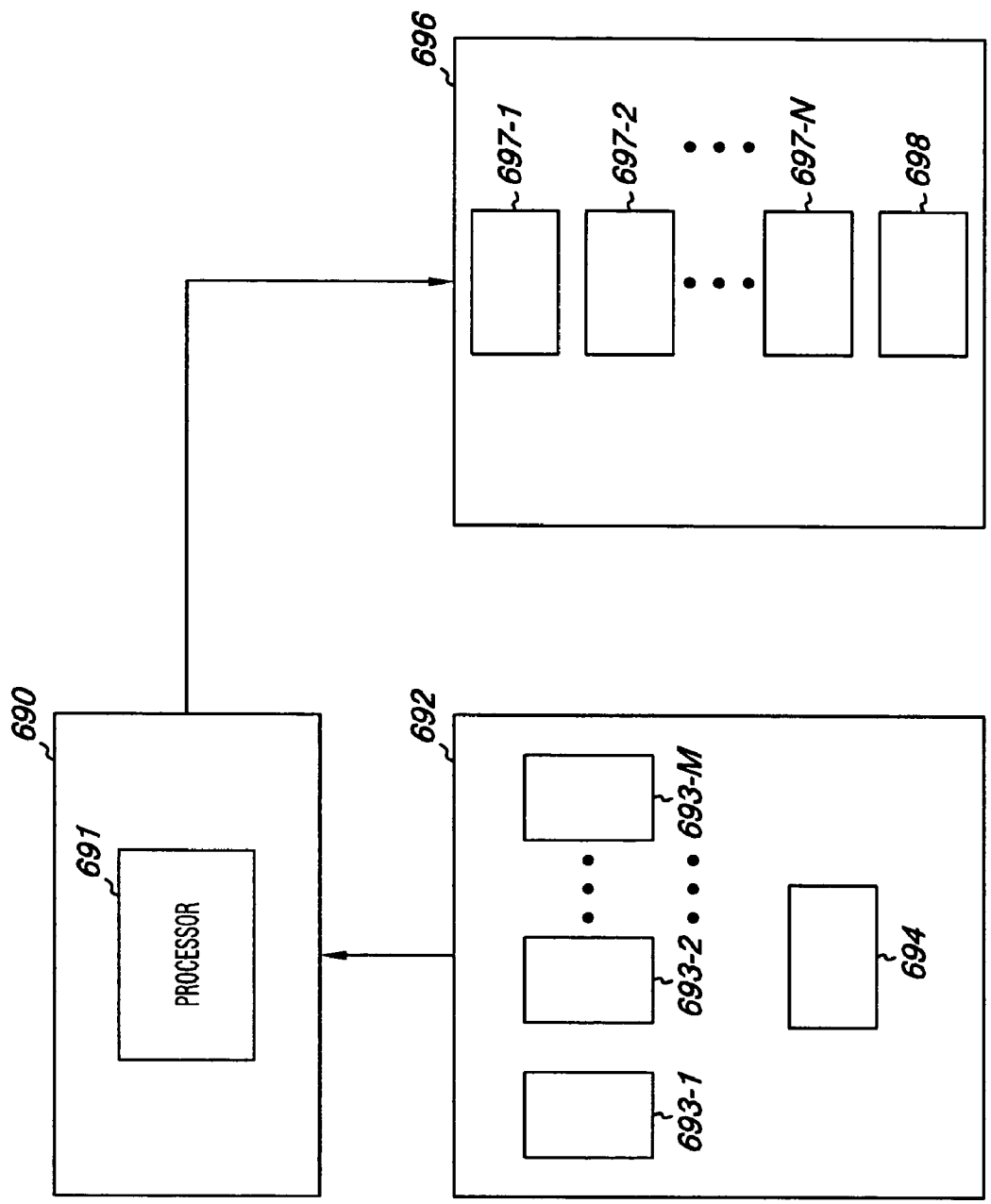
FIG. 6 is a block diagram including a programmable logic controller (PLC) that can be used with various planting device embodiments of the present disclosure.

FIG. 6 is a block diagram including a programmable logic controller (PLC) that can be used with various high speed planting device embodiments of the present disclosure. As shown in the embodiment of FIG. 6, the PLC 690 can be electrically coupled to various input components 692 and output components 696 of a planting device (e.g., planting device 100 shown in FIG. 1). In operation, the processor 691 of the PLC can receive electrical signals from the input components which can be used to monitor and/or control the various output components.

As shown in the embodiment of FIG. 6, the input components 692 can include a number of sensors 693-1, 693-2, ... 693-M, among various other logic circuitry 694. The indicator "M" is used to illustrate that the input components can include any number of sensors. The sensors 693-1 to 693-M can include various proximity, motion, and/or temperature sensors, among other types of sensors. The sensors can be located at various locations on and/or around the planting device. For instance, sensors can be positioned to determine the vertical location and/or speed of the ram (e.g., ram 410), and/or to determine the presence of a tree slip (e.g., in receiving slot 409) and/or its orientation and depth after being planted. The logic circuitry 694 can include a number of switches (e.g., relays) that can perform various functions such as signaling the PLC when the trigger mechanism and/or recoil unit reaches or passes a certain vertical distance, e.g., when to fire the accelerating unit, for example.

As shown in the embodiment of FIG. 6, the output components 696 can include a number of electromechanical control valves 697-1, 697-2, ... 697-N, among various other logic circuitry 698. The indicator "N" is used to illustrate that the output components can include any number of control valves. The control valves 697-1 to 693-N can include solenoid valves, among other types of electromechanical valves.

In various embodiments, the control valves 697-1 to 697-N can be controlled by the PLC to operate various hydraulic components of the planting device. For example, the control valves can be controlled to start and/or stop hydraulic fluid flow in order to raise and/or lower the plunger arm of a hydraulic cylinder (e.g., a hydraulic cylinder of lifting device 101 as shown in FIG. 1) to raise and lower the trigger mechanism of the planting device. Other hydraulic cylinders that may be associated with the tree slip feeder and/or a three point hitch can also be controlled by the PLC.

Figure 7:
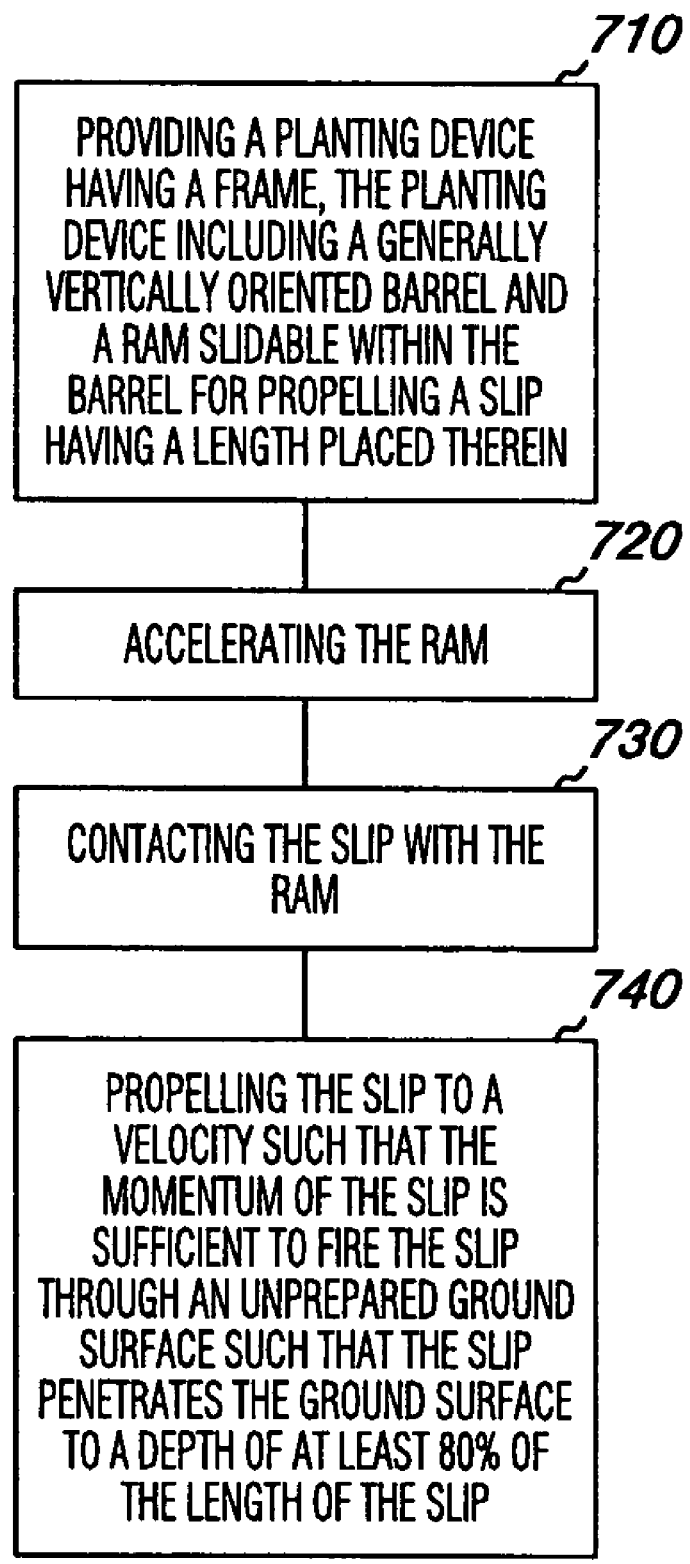
FIG. 7 is a block diagram of a method embodiment for planting tree slips according to the present disclosure.

FIG. 7 is a block diagram of a method embodiment for planting tree slips according to the present disclosure. At block 710, the method includes providing a planting device having a frame, the planting device including a generally vertically oriented barrel and a ram slidable within the barrel for propelling a slip having a length placed therein.

At block 720, the method includes accelerating the ram. As described herein, the means for accelerating the ram can be a recoil unit, e.g., recoil unit 250 as described in FIGS. 2A and 2B. The means for accelerating the ram are not limited to such recoil units. For example, the means for accelerating the ram can be a combustible gas which can be ignited or compressed to create an explosion which forces the ram downward.

At block 730, the method includes contacting the slip with the ram. At block 740, the method includes propelling the slip to a velocity such that the momentum of the slip is sufficient to fire the slip through an unprepared ground surface such that the slip penetrates the ground surface to a depth of at least 80% of the length of the slip. In some embodiments, the slip is propelled to a velocity such that the momentum of the slip is sufficient to fire the slip through an unprepared ground surface such that the slip penetrates the ground surface to a depth of at least 90% of the length of the slip. In some embodiments, the method includes stopping the ram such that the slip is not in contact with the ram when penetrating the ground surface.

In various method embodiments, the barrel is fixed with respect to the frame and is moving with respect to the ground surface during the firing of the slip through the ground surface. Also, in various embodiments, the method can include providing a vehicle to move the planting device across the ground surface. In such embodiments the method can include contacting the slip with the ram while the barrel is moving across the surface, e.g., the barrel is not stationary with respect to the ground surface when the ram contacts the slip.

In various method embodiments, the method can include providing a planting device that includes a tree slip accelerating unit fixedly mounted to a frame of the device in a vertical direction. In such embodiments, the accelerating unit can include a ram movable through a barrel, and a recoil unit attached to the top end of the ram. In such embodiments, the method can include firing the accelerating unit such that the recoil unit moves the ram downward against a tree slip to accelerate the tree slip downward such that the tree slip is planted substantially vertically into the ground while the accelerating unit is moving across the ground surface at a particular speed. As described above, one or more planting devices can be attached to a frame and moved across the ground surface at a speed of about 8 feet per second by a vehicle.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for planting of a tree slip in a ground, comprising:
   providing a planting device having a frame, the planting device including a generally vertically oriented barrel and a ram slidable within the barrel for propelling a slip having a length placed therein;
   accelerating the ram;
   contacting the slip with the ram; and
   propelling the slip to a velocity sufficient to fire the slip generally vertically through an unprepared ground surface.

2. The method of claim 1, wherein the barrel is fixed with respect to the frame and is moving with respect to the ground surface during the firing of the slip through the ground surface.

3. The method of claim 1, wherein the method includes:
   providing a vehicle to move the planting device across the ground surface; and
   contacting the slip with the ram while the barrel is moving across the surface.

4. The method of claim 1, wherein the method includes stopping the ram such that the slip is not in contact with the ram when penetrating the ground surface.

5. A method for planting tree slips in a ground, comprising:
   providing a planting device that includes a tree slip accelerating unit fixedly mounted to a frame of the device in a vertical direction, the accelerating unit including:
   a ram movable through a barrel; and
   a recoil unit attached to a top end of the ram and having at least one stop member external to the barrel for stopping the ram as it moves through the barrel; and
   firing the accelerating unit such that the recoil unit moves the ram downward against a tree slip to accelerate the tree slip downward such that the tree slip is planted substantially vertically into the ground while the accelerating unit is moving across the ground surface at a particular speed.

6. The method of claim 5, wherein fifing the accelerating unit includes accelerating the tree slip downward to a rate of at least 200 feet per second.

7. The method of claim 5, wherein the method includes moving the planting device in a direction of travel at the particular speed with a vehicle, and wherein the accelerating unit remains at the particular speed in the direction of travel while the tree slip is planted into the ground.

8. The method of claim 5, wherein firing the accelerating unit to plant the tree slip substantially vertically into the ground includes moving the accelerating unit across the ground surface at a speed of at least eight feet per second.

9. The method of claim 8, wherein the method includes planting a number of tree slips substantially vertically into the ground at a rate of at least one tree slip per second.

10. The method of claim 5, wherein the method includes:
    engaging a trigger mechanism of the accelerating unit to the top end of the ram and raising the ram to a first position using a lifting unit of the planting device; and
    firing the accelerating unit by disengaging the trigger mechanism from the ram such that the ram is propelled downward to a second position by a recoil force provided by an elastic member of the recoil unit.

11. The method of claim 10, wherein firing the accelerating unit by disengaging the trigger mechanism from the ram includes firing the accelerating unit such that a bottom end of the ram is not more than 2 inches from an upper end of the tree slip when the accelerating unit is fired.

12. The method of claim 10, wherein the method includes delivering the tree slip in a vertical position to a slot in the bottom end of the barrel prior to firing the accelerating unit.

13. The method of claim 5, wherein firing the accelerating unit such that the recoil unit moves the ram downward against a tree slip includes firing the accelerating unit such that the recoil unit moves the ram downward against a tree slip formed by freezing a seedling into a generally cylindrical ice structure.

14. A planting device, comprising:
   a vertically oriented barrel attached to a frame;
   a ram slidable within the barrel for propelling a slip having a length placed therein; and
   a means for accelerating the ram downward to contact the slip and accelerate the slip to a velocity sufficient to propel the slip generally vertically through an unprepared ground surface such that the slip penetrates the ground to a depth of at least 80% of the length of the slip.

15. The device of claim 14, wherein the barrel is fixed with respect to the frame and is moving with respect to the ground surface when the slip penetrates the ground surface.

16. The device of claim 14, wherein the slip is accelerated to a velocity of at least 100 feet per second.

17. The device of claim 14, wherein the means for accelerating the ram downward to contact the slip, accelerates the slip to a velocity such that the momentum of the slip and ram is sufficient to propel the slip through an unprepared ground surface such that the slip penetrates the ground to a depth of at least 80% of the length of the slip.

18. The device of claim 14, wherein the ram remains in contact with the slip until at least a portion of the slip penetrates the ground surface.

19. The device of claim 14, wherein the slip is a cooled slip.

20. The device of claim 14, wherein the means for accelerating the ram downward is a recoil unit having an upper portion and a lower portion connected by an elastic member.

21. The device of claim 20, wherein the device includes a lifting mechanism having a trigger mechanism attached to:
   engage a top end of the ram;
   move the upper portion of the recoil unit to stretch the elastic member; and
   move the trigger mechanism against a disengagement member to fire the trigger mechanism.

22. The device of claim 14, wherein the ram loses contact with the slip prior to the slip penetrating the ground surface.

23. A planting device, comprising:
   a barrel having an upper end and a lower end, the barrel for receiving a tree slip thereto and passing a ram therethrough to contact the tree slip and accelerate the tree slip toward a ground surface to plant the tree slip in the ground;
   a recoil unit at the lower end of the barrel, the recoil unit including:
      an upper portion attached to the ram near a top end of the ram, wherein the upper portion is slidably attached to the barrel for moving vertically between a first position and a second position; and
      an elastic member attached from the upper portion to a lower portion of the recoil unit for providing a downward recoil force to move the upper portion from the first to the second position to accelerate the tree slip toward the ground surface.

24. The device of claim 23, wherein the device includes a lifting unit having a trigger mechanism, the trigger mechanism slidably attached to the barrel for:
   engaging the ram and raising the upper portion of the recoil unit to the first position; and
   disengaging the ram when the upper portion of the recoil unit reaches the second position allowing the downward recoil force to propel the upper portion downward such that the tree slip is accelerated toward the ground surface and is planted therein.

25. The device of claim 24, wherein the trigger mechanism includes a trigger latch at a lower end of the trigger mechanism for releasably engaging with a notch at the top end of the ram.

26. The device of claim 23, wherein the recoil unit includes a stop mechanism to prevent the upper portion from moving past the second position in the downward direction to facilitate a suitable planting depth of the tree slip.

27. The device of claim 23, wherein the stop mechanism includes a first stop at the upper portion of the recoil unit and a second stop at the lower portion of the recoil unit.

28. The device of claim 27, wherein the second stop includes one or more shock absorbing wheels rotatably mounted to a frame of the planting device and configured to roll along the ground surface.

* * * * *